(12) United States Patent
Murase

(10) Patent No.: US 7,593,902 B2
(45) Date of Patent: Sep. 22, 2009

(54) COMMUNICATION SYSTEM, COMMUNICATION METHOD, SERVER APPARATUS, AND CLIENT APPARATUS

(75) Inventor: Yasuhiro Murase, Tokyo (JP)

(73) Assignee: Sony Corporation, Tokyo (JP)

( * ) Notice: Subject to any disclaimer, the term of this patent is extended or adjusted under 35 U.S.C. 154(b) by 717 days.

(21) Appl. No.: 10/918,349

(22) Filed: Aug. 16, 2004

(65) Prior Publication Data

US 2005/0060701 A1 Mar. 17, 2005

(30) Foreign Application Priority Data

Sep. 16, 2003 (JP) ............................. 2003-322525

(51) Int. Cl.
G06F 21/00 (2006.01)
(52) U.S. Cl. ............................. 705/59; 705/52; 705/26; 713/176
(58) Field of Classification Search .................... 705/59
See application file for complete search history.

(56) References Cited

U.S. PATENT DOCUMENTS

| | | | | |
|---|---|---|---|---|
| 5,671,412 A * | 9/1997 | Christiano | ............... | 707/104.1 |
| 5,963,916 A * | 10/1999 | Kaplan | ......................... | 705/26 |
| 6,385,596 B1 * | 5/2002 | Wiser et al. | ................... | 705/51 |
| 7,167,841 B2 * | 1/2007 | Hatano et al. | ................. | 705/56 |
| 2002/0065741 A1 * | 5/2002 | Baum | ........................... | 705/26 |
| 2005/0091679 A1 | 4/2005 | Tanaka et al. | | |
| 2005/0132083 A1 * | 6/2005 | Raciborski et al. | .......... | 709/232 |
| 2005/0240295 A1 * | 10/2005 | Vilcauskas et al. | ............ | 700/94 |
| 2006/0089912 A1 * | 4/2006 | Spagna et al. | ................. | 705/51 |

FOREIGN PATENT DOCUMENTS

| | | |
|---|---|---|
| JP | 2001-22843 | 1/2001 |
| JP | 2002-324170 | 11/2002 |

OTHER PUBLICATIONS

U.S. Appl. No. 10/526,902, filed Aug. 16, 2005, Yamashita et al.

(Continued)

*Primary Examiner*—Andrew J. Fischer
*Assistant Examiner*—Mamon Obeid
(74) *Attorney, Agent, or Firm*—Oblon, Spivak, McClelland, Maier & Neustadt, L.L.P.

(57) ABSTRACT

The present invention is intended to lighten the user load for the distribution of content in an album form. In order to look at/listen to album content, a user executes album content purchase operation. In response to a request for the distribution of a first item of content, a content server sends the requested content to a terminal. After the distribution, the terminal acquires the license of the first item of content. The content and its license are bound each other in the terminal. The license server executes, on a charging and settlement server, the processing necessary for the charging and settlement of the fee of the purchased album content. In response, the charging and settlement server executes the charging and settlement processing. The subject of charging is not only the first item of content, but also all items of content packaged as album content. Subsequently, all items of content in the album are downloaded.

8 Claims, 7 Drawing Sheets

OTHER PUBLICATIONS

U.S. Appl. No. 10/554,542, filed Oct. 25, 2005, Iwatsu et al.
U.S. Appl. No. 10/564,317, filed Jan. 12, 2006, Kikkoji et al.
U.S. Appl. No. 10/557,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan. 4, 2006, Iwatsu et al.
U.S. Appl. No. 10/557,141, filed Nov. 17, 2005, Murase et al.
U.S. Appl. No. 10/556,728, filed Nov. 14, 2005, Iwatsu et al.
U.S. Appl. No. 10/563,315, filed Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/561,187, filed Dec. 16, 2005, Araki et al.
U.S. Appl. No. 10/565,965, filed Jan. 26, 2006, Iwatsu.
U.S. Appl. No. 10/564,058, filed Jan. 10, 2006, Kikkoji et al.
U.S. Appl. No. 10/556,893, filed Nov. 15, 2005, Sakoh et al.
U.S. Appl. No. 10/557,040, filed Nov. 16, 2005, Kikkoji et al.
U.S. Appl. No. 10/556,729, filed Nov. 14, 2005, Kikkoji et al.
U.S. Appl. No. 10/555,990, filed Nov. 8, 2005, Murase et al.
U.S. Appl. No. 10/560,229, filed Dec. 12, 2005, Kikkoji et al.
U.S. Appl. No. 10/564,062, filed Jan. 10, 2006, Kikkoji et al.
U.S. Appl. No. 10/567,689, filed Feb. 9, 2006, Kikkoji et al.
U.S. Appl. No. 10/567,033, filed Feb. 3, 2006, Sakoh et al.
U.S. Appl. No. 10/572,743, filed Mar. 21, 2006, Kikkoji et al.
U.S. Appl. No. 10/564,414, filed Jan. 12, 2006, Sakoh et al.
U.S. Appl. No. 10/571,540, filed Mar. 10, 2006, Sakoh et al.
U.S. Appl. No. 10/567,776, filed Feb. 9, 2006, Iwatsu et al.
U.S. Appl. No. 10/568,968, filed Feb. 22, 2006, Okuzawa.
U.S. Appl. No. 10/569,227, filed Feb. 23, 2006, Yasuda.
U.S. Appl. No. 10/573,580, filed Mar. 24, 2006, Sakoh et al.
U.S. Appl. No. 10/573,418, filed Mar. 27, 2006, Iwatsu et al.
U.S. Appl. No. 10/571,458, filed Mar. 13, 2006, Iwatsu et al.
U.S. Appl. No. 10/571,774, filed Mar. 15, 2006, Sakoh et al.
U.S. Appl. No. 10/573,647, filed Mar. 28, 2006, Kikkoji et al.

* cited by examiner

F I G. 5

| ALBUM ID | TITLE | ARTIST | LABEL | CONTENT COUNT | CONTENT ID | ALBUM PRICE |
|---|---|---|---|---|---|---|
| 0008492 | RAINBOW | HAMADA AYUMI | VEX | 15 | 0005349 0004929 | 2,000 YEN |
| ... | ... | ... | ... | ... | ... | ... |

F I G. 6

| CONTENT ID | TITLE | ARTIST | LABEL | UNIT PRICE |
|---|---|---|---|---|
| 0005349 | Free&Easy | HAMADA AYUMI | VEX | 200 YEN |
| 0004929 | Voyage | HAMADA AYUMI | VEX | 200 YEN |
| ... | ... | ... | ... | ... |

F I G. 7

| USER'S PERSONAL INFORMATION | PURCHASE LOG | CHARGING | LICENSE DISTRIBUTION SITUATION FOR EACH CONTENT (=CONTENT PURCHASE STATUS) |
|---|---|---|---|
| USER ID<br>NAME<br>ADDRESS<br>PASSWORD<br>... | ALBUM ID<br>=00008492 | DONE | 0005349  0004929  ...  NOT     NOT<br>DONE   DONE          DONE   DONE |

COMMUNICATION SYSTEM, COMMUNICATION METHOD, SERVER APPARATUS, AND CLIENT APPARATUS

BACKGROUND OF THE INVENTION

The present invention relates generally to a communication system, a communication method, a server apparatus, and a client apparatus which are intended for distributing video content and music content for example via the Internet.

Today, it is known that content such as music content for example is distributed from content distribution service entities to users. Conventionally, however, there are distribution and sale methods that can only perform the distribution and sale of a single item of content and plural items of content, there making it impossible to perform the distribution and sale of content in the form of albums.

Therefore, the related-art content distribution technique presents a problem that, if an attempt is made to sell, as content, each album music CD (Compact Disc) sold at the store, each track of each music CD must be handled as one item of content and one music CD must be distributed as plural items of content, thereby losing the integrity of each album music CD as an album.

It should be noted that a method of distributing and selling a single item of content denotes a method in which one item of content is distributed in response to one content distribution request from a user and charging is executed on the distributed one item of content. On the other hand, a method of distributing and selling plural items of content denotes a method in which plural items of content are distributed in response to one content distribution request from a user and charging is executed on each of the distributed plural items of content (charging is executed by the number of times equivalent to the number of items of content).

The above-mentioned related-art content distribution method requires the user to repeat the same information entry operation every time he/she wants to acquire album content and the amount of information to be entered significantly increases as the case may be, thereby hindering user convenience.

SUMMARY OF THE INVENTION

It is therefore an object of the present invention to provide a communication system, a communication method, a server apparatus, and a client apparatus which are capable of providing the distribution and sale of album content lighten in the load of user's operation of information entry. To be more specific, for each request by the user for content, the album distribution and sale according to the invention distributes album content (which is a unit of sale obtained by bringing together plural items of content into one distribution and sale unit and distributed and sold as an album package) and executes charging on this one item of album content (although one album contains plural items of content, charging is executed only once for this one album).

In carrying out the invention and according to an aspect thereof, there is provided a communication system for downloading data from a server apparatus to a client apparatus interconnected with each other via a network, wherein the data is configured by a plurality of independent data files; each of the plurality of independent data files contains data file identification information by which the each data file is identifiable; the client apparatus sequentially downloads the plurality of independent data files from the server apparatus; in the downloading, the server executes, on the client apparatus, charging processing associated with all of the data; and in downloading each of the plurality of independent data files, the server apparatus checks a status associated with the charging processing.

In carrying out the invention and according to another aspect thereof, there is provided a communication method of downloading data from a server apparatus to a client apparatus interconnected with each other via a network, wherein the data is configured by a plurality of independent data files; each of the plurality of independent data files contains data file identification information by which the each data file is identifiable; the client apparatus sequentially downloads the plurality of independent data files from the server apparatus; in the downloading, the server executes, on the client apparatus, charging processing associated with all of the data; and in downloading each of the plurality of independent data files, the server apparatus checks a status associated with the charging processing.

In carrying out the invention and according to still another aspect thereof, there is provided a server apparatus for providing data to a client apparatus interconnected with each other via a network, wherein the data is configured by a plurality of independent data files; each of the plurality of independent data files contains data file identification information by which the each data file is identifiable; the client apparatus is adapted to sequentially download the plurality of independent data files from the server apparatus; in the sequential downloading by the client apparatus of the plurality of independent data files, the server executes, on the client apparatus, charging processing associated with all of the data; and in downloading each of the plurality of independent data files, the server apparatus checks a status associated with the charging processing.

In carrying out the invention and according to yet another aspect thereof, there is provided a client apparatus for downloading data from a server apparatus interconnected with each other via a network, wherein the data is configured by a plurality of independent data files; each of the plurality of independent data files contains data file identification information by which the each data file is identifiable; the client apparatus sends user information and license distribution request to the server apparatus; the client apparatus receives a license from the server apparatus; the client apparatus makes the plurality of independent data files downloaded from the server apparatus usable by the license received from the server apparatus; and the server apparatus executes charging processing associated with all of the data.

The first advantage of the invention is that album content can be distributed and sold which is impracticable by the related-art technologies. In an example of music CD albums sold at the store, the novel configuration according to the invention allows the provision, to the user, also of content distribution without destroying the musical integrity of the album configuration of music CDs.

The second advantage of the invention is that services not practicable by the distribution and sale of a single content item or plural content items can be developed. For example, in the case where the user purchased an album content by use of a distribution and sale method based on a single content item or plural content items and a separately provided album content which is the same in content as the album content purchased by the user is found cheaper in price, the difference may be refunded to the user.

BRIEF DESCRIPTION OF THE DRAWINGS

These and other objects of the invention will be seen by reference to the description, taken in connection with the accompanying drawing, in which:

FIG. 5 is a schematic diagram illustrating one example of an album management database in a content server practiced as the embodiment of the invention;

FIG. 6 is a schematic diagram illustrating an example of the above-mentioned album management database in a content server practiced as the embodiment of the invention; and FIG. 7 is a schematic diagram illustrating an example of purchase management database in a license server practiced as the embodiment of the invention.

DETAILED DESCRIPTION OF THE PREFERRED EMBODIMENTS

Figure 1:
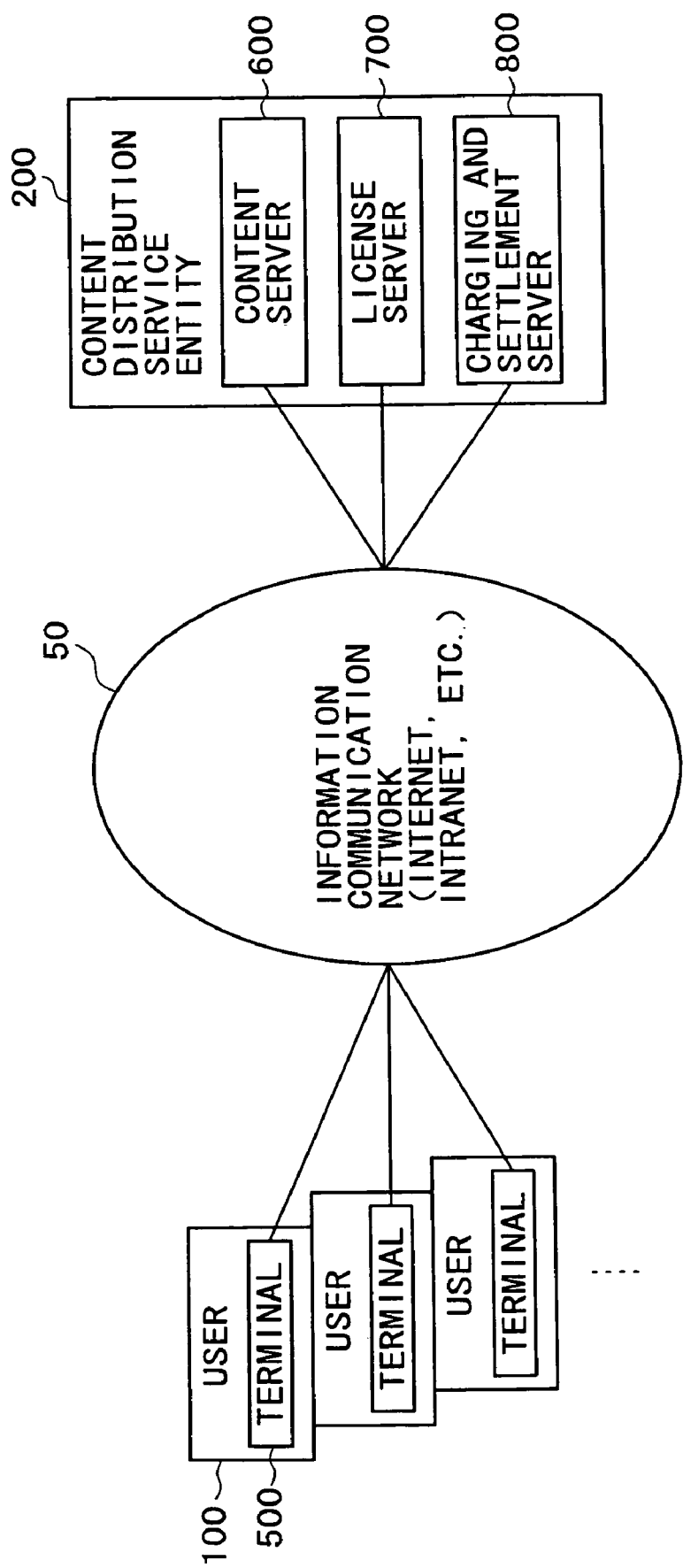
FIG. 1 is a block diagram illustrating an exemplary configuration of a system practiced as one embodiment of the invention.

This invention will be described in further detail by way of example with reference to the accompanying drawings. Now, referring to FIG. 1, in an embodiment of the invention, it is supposed that the system be configured of two elements, a user 100 and a content distribution service entity (hereafter referred to as a distribution business entity) 200. A service model composed of the number of elements and roles shown below is also supposed.

1. Number of Elements

"User 100: distribution business entity 200=n:1"

2. Roles (1) User 100

The user 100 receives the provision of content distribution services by the distribution business entity 200. The user 100 is capable of receiving content distribution services by directly making a contract with the distribution business entity 200.

(2) Distribution Business Entity 200

The distribution business entity 200 provides content distribution services to the user 100. By use of the content distribution system, the distribution business entity 200 provides the user 100 with a variety of items of content regardless whether they are charged or not charged. One of distribution methods is an album distribution method according to the invention.

In what follows, a system configuration for realizing the above-mentioned service model is supposed. The individual elements, the number of elements, and roles are as follows.

1. The Number of Elements:

"Terminal 500: content server 600: license server 700: charging and settlement server 800=n:1:1:1"

2. Roles (1) Terminal 500

The terminal 500 is a system, a program, and an apparatus connected to an information communication network 50 which are necessary for the user 100 to receive content distribution services. It should be noted that it is also practicable to hold the distributed content at the terminal 500.

(2) Content Server 600

The content server 600 is a system, a program, and an apparatus connected to the information communication network 50 which are necessary for holding content containing music and video data necessary for looking at/listening to the content distribution system and distributing the content to the user 100.

(3) License Server 700

The license server 700 is a system, a program, and an apparatus connected to the information communication network 50 which are necessary for holding licenses which are the right and the right of use for looking at/listening to content at the content distribution system and distributing the licenses to the user 100. The user 100 can look at/listen to content only when he/she receives both content and license.

(4) Charging and Settlement Server 800

The charging and settlement server 800 is a system, a program, and an apparatus connected to the information communication network 50 which are necessary for executing the charging and settlement of the fees for the provision of content distribution services to the user 100.

(5) Information Communication Network 50

The information communication network 50 which can be realized by the present invention is the Internet or an intranet, which is necessary for interconnecting the terminal 500, the content server 600, the license server 700, and the charging and settlement server 800.

Figure 2:
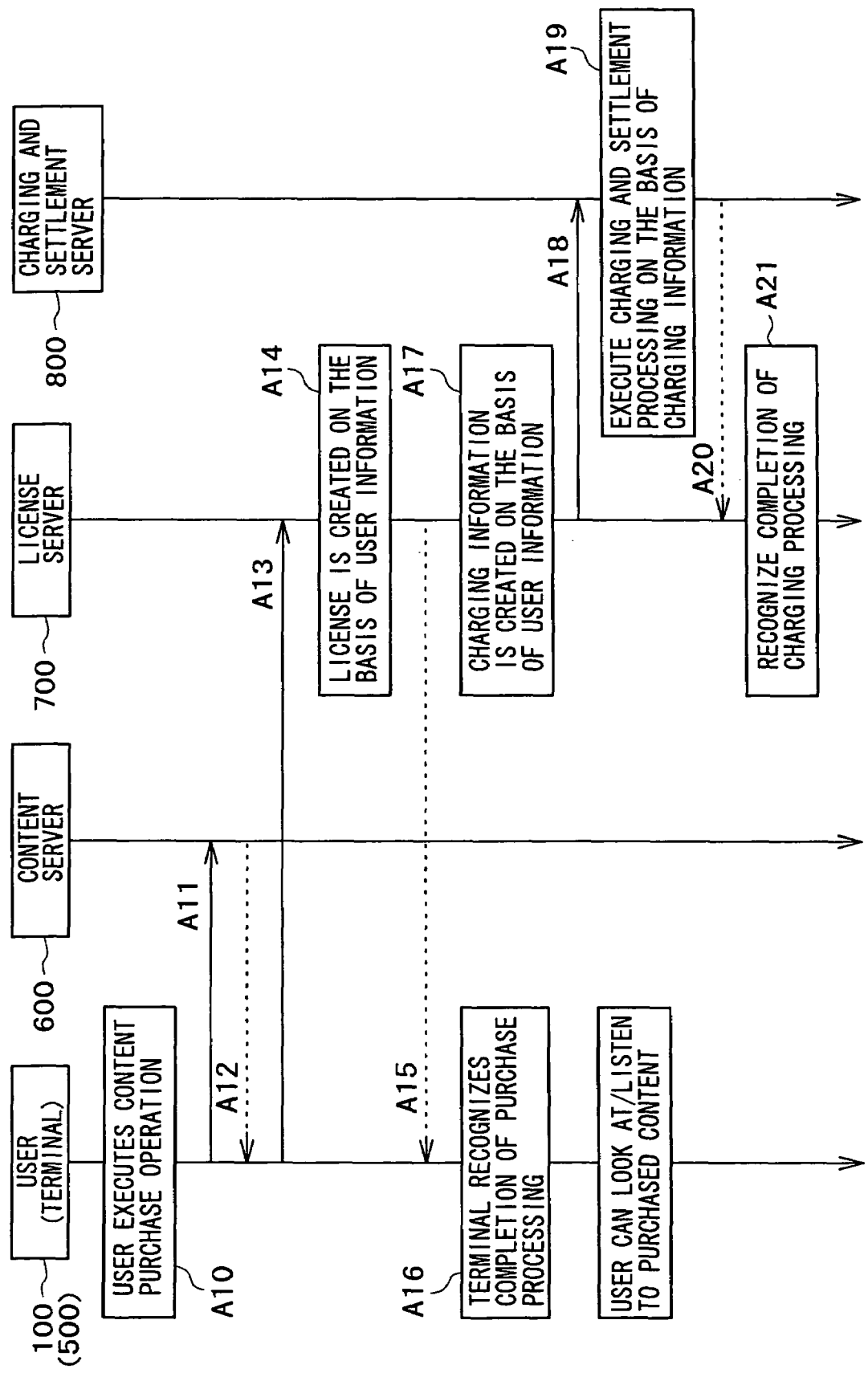
FIG. 2 is a flowchart indicative of a flow of related-art processing.

In order to facilitate the understanding of the present invention, the following describes a related-art content distribution, sale method and system in a time-dependent manner with reference to FIGS. 1 and 2. It should be noted that reference characters such as A10 for example shown in FIG. 2 are assigned to each operation to be done. The combinations of these operations realize the related-art method and system. It should also be noted that each communication path described herein may be partially to totally encrypted in consideration of security.

1. In order for the user 100 to look at/listen to content, the user 100 performs a content purchase operation (step A10). It should be noted that the content purchase operation denotes an operation of entering the personal information for example of the user 100 necessary for selecting and purchasing desired content by use of the terminal 500.

2. In response to a purchase request from the user 100, the terminal 500 sends a request for distributing the first content in the album content selected by the user 100 to the content server 600 (step A11).

3. In response to the content distribution request from the terminal 500, the content server 600 searches itself for the content requested by the terminal 500 and sends the retrieved content to the terminal 500 (the response to content distribution in step A12).

4. The terminal 500 on which the content has been downloaded downloads the license from the license server 700. To do so, the terminal 500 requests the license server 700 for the distribution of the content license. At the same time, the terminal 500 sends the personal information of the user 100 necessary for the creation of the license (step A13).

5. In response to the request of license distribution for the first content, the license server 700 creates the license for the content on the basis of the personal information of the user 100 supplied from the terminal 500 (step A14).

6. The license server 700 sends the created content license to the terminal 500 (step A15).

7. The terminal 500 distributed with the content license recognizes the normal completion of the distribution of both the content and its license and then binds them together, storing them in the terminal 500 (step A16). After the completion of step A16, the terminal 500, upon request by the user 100 for looking at/listening to the content and the operation by the user therefor, matches the content with its license, and if a match is found, can reproduce the content selected by the user 100.

8. In order to execute the charging and settlement processing on the album content immediately after supplying the content license to the terminal 500, the license server 700 creates charging and settlement information on the basis of the personal information of the user 100 supplied from the terminal 500 (step A17). At the same time, in order to execute the charging and settlement processing, the license server 700 requests the charging and settlement server 800 for charging (step A18). At this moment, the license server 700 sends the charging information created by the license server 700 to the charging and settlement server 800. It should be noted that the content charging processing is executed at the distribution of the license which is the right of use.

9. In response to the charging request from the license server 700, the charging and settlement server 800 executes the charging and settlement processing on the basis of the charging information supplied at the same time (step A19). Having completed the charging and settlement processing, the charging and settlement server 800 sends the result of the processing to the license server 700 (step A20). Then, in response to the processing result received from the charging and settlement server 800, the license server 700 checks the processing result, and if the processing is found not normally completed, requests the charging and settlement server 800 to retry the charging and settlement processing. If the processing result indicates the normal completion of the charging and settlement processing, then the retry is not requested (step A21).

It should be noted that, if there are two or more items of content to be purchased, then the processing of 2 to 7 above is repeated by the number of content items.

Figure 3:
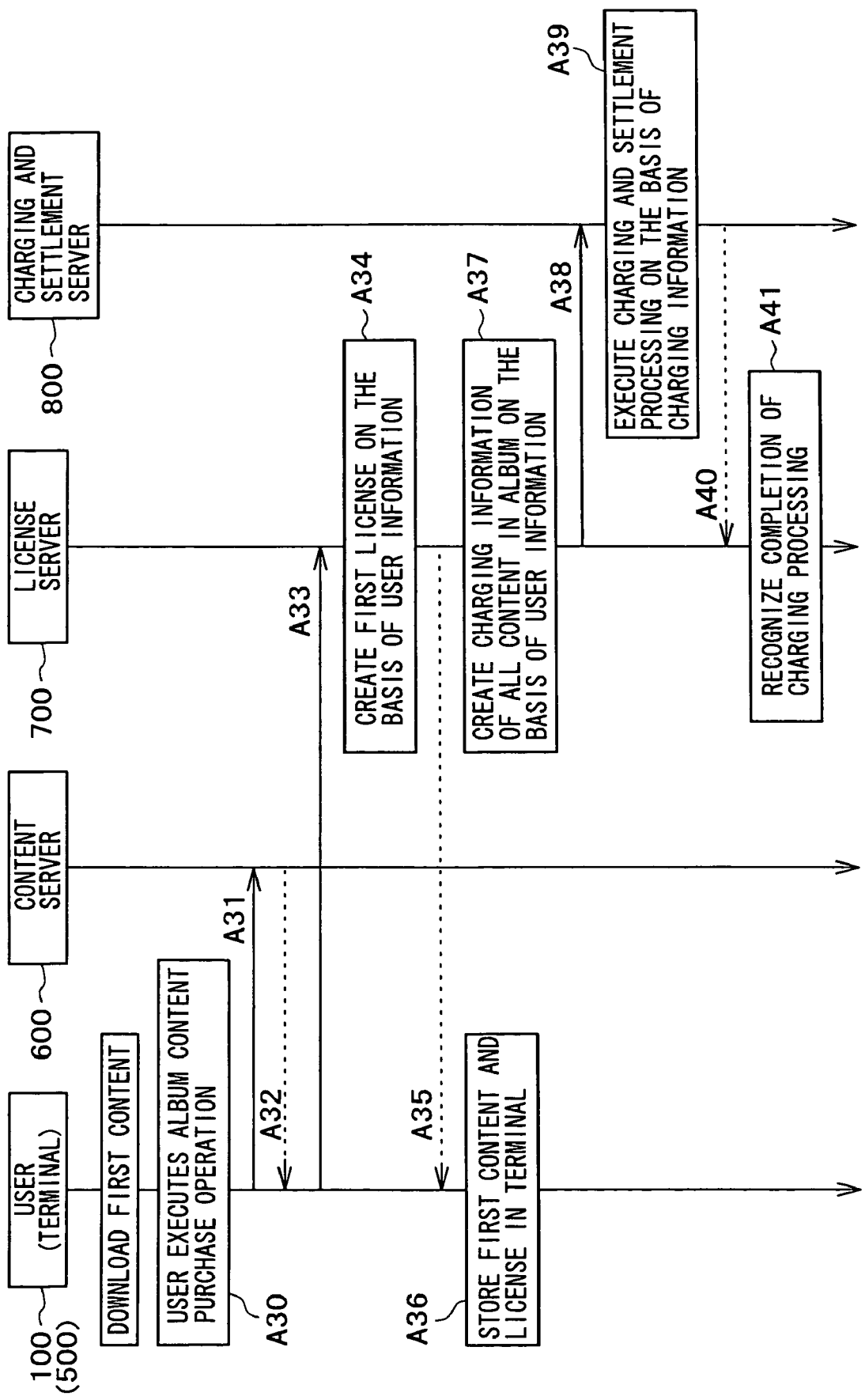
FIG. 3 is a flowchart indicative of a processing flow practiced as an embodiment of the invention.
Figure 4:
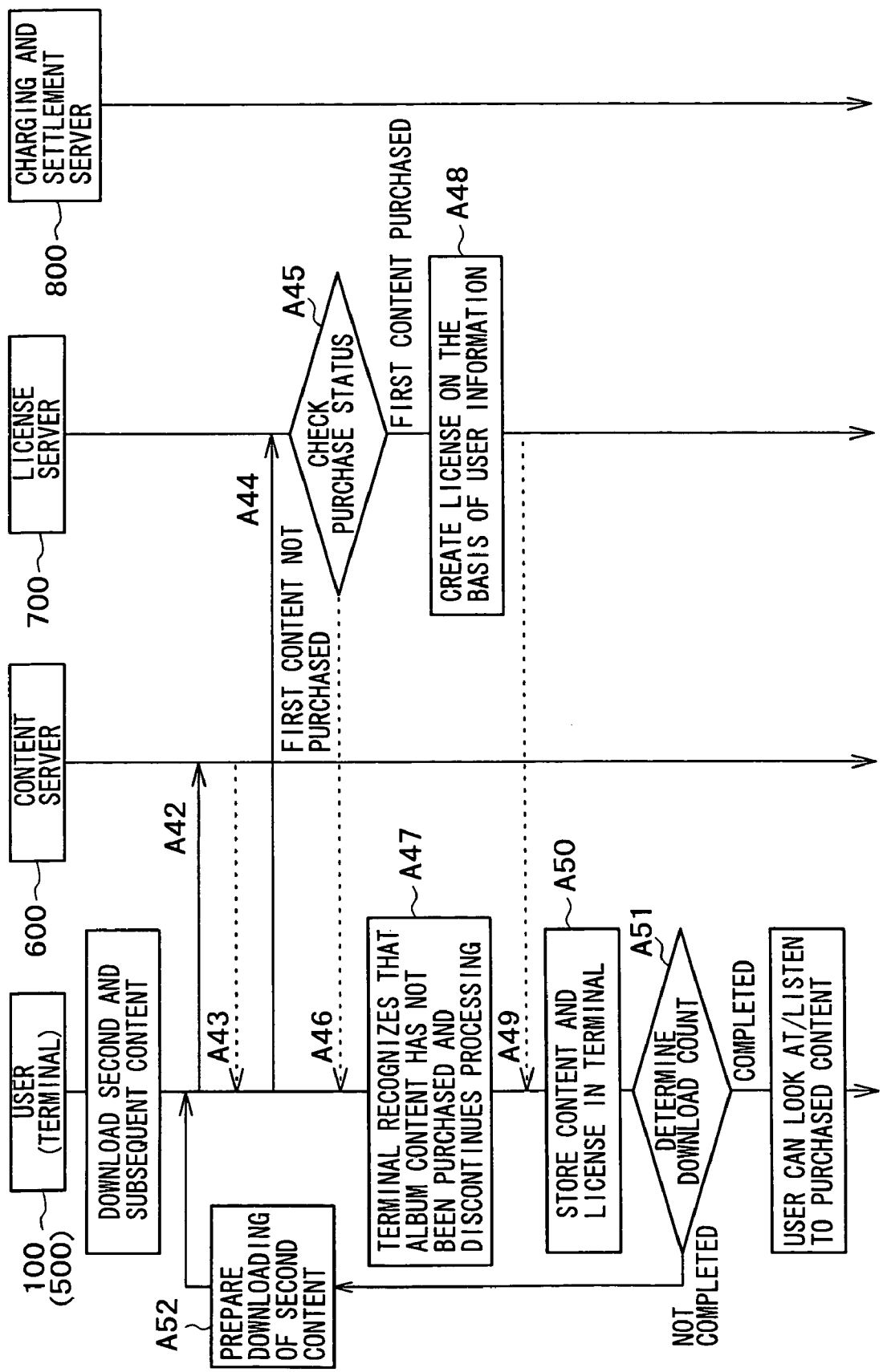
FIG. 4 is a flowchart indicative of a processing flow practiced as the embodiment of the invention.

The following describes an album content distribution and sale method according to the invention with reference to FIGS. 1, 3, and 4. It should be noted that the content handled herein is not a single item of content, but the content (hereafter referred to as album content) which is obtained by putting plural items of content into one distribution and sale unit, attaching album-unique information to the content, and packing the resultant content as one album.

The above-mentioned album-unique information attached to the content denotes album identification information such as album name or album ID by which the album to which the content in question belongs is identifiable and the information such as a total number of content items included in the album and the track number indicative where in the track sequence in the album the content in question is located. These items of information are required at the terminal 500 to understand the situation of the downloading of the content included in each album. If some accident happens, discontinuing the communication, the downloading can be promptly restarted by use of these items of information. In addition, the license for the content in question may be attached with content identification information such as content ID by which the licensed content is identifiable or the above-mentioned album-unique information which is attached to the content in question.

1. In order for the user 100 to look at/listen to album content, the user 100 executes an album content purchase operation. The album content purchase operation denotes an operation of entering the personal information for example of the user 100 necessary for selecting and purchasing a desired album content by use of the terminal 500.

2. In response to the purchase operation by the user 100, the terminal 500 first downloads the first item in the album content selected by the user 100 from the content server 600.

3. The terminal 500 on which the content has been downloaded downloads the license for the first item of content from the license server 700. At this moment, immediately after the distribution of the license to the terminal 500, the license server 700 executes, on the charging and settlement server 800, the processing necessary for the charging and settlement of the fee of the album content. In response, the charging and settlement server 800 executes the charging and settlement processing. It should be noted that the subject of charging is not only the first item of content but also all items of content which are packaged as album content. Namely, when the charging and settlement processing is executed on the license for the first item of content, all items of content packaged as an album content are charged and settled in a bulk (hereafter referred to as album-unit charging and settlement processing).

4. The terminal 500 on which the first item of content and its license have been downloaded binds them together and stores them in itself.

5. When the downloading of the first item of content and its license has been completed, the terminal 500 downloads the second and subsequent items of content. It should be noted that the downloading of content and its license is executed as with processing 2 and processing 3 but, in the case of album content downloading, the charging and settlement processing immediately after the downloading of the second and subsequent items of content is not executed; this is because the album-unit charging and settlement processing has already been executed at the downloading of the first item of content and its license, it is not necessary to execute the charging and settlement processing on each license for the second and subsequent items of content. Also, a configuration is provided in which the downloading of the second and subsequent items of content and their licenses cannot be executed by anyone; only the user 100 to whom the charging and settlement processing has been executed at the downloading of the license of the first item of content can download the second and subsequent items of content and their licenses.

6. The terminal 500 on which the second and subsequent items of content and their licenses have been downloaded executes the processing of binding the second and subsequent items of content with their licenses and stores them in itself.

7. Then, if there still remain items of content to be downloaded, processing 5 and processing 6 are repeatedly executed.

8. When the downloading of all items of content in the album has been completed, the terminal 500 on which the user 100 has done an operation for requesting the looking at/listening to the content executes a matching between the items of content and their licenses and then reproduces the selected content.

The following describes the detailed operations of an embodiment of the invention with reference to FIGS. 3 and 4. It should be noted that references such as A30 for example shown in FIGS. 3 and 4 are assigned to each operation to be done. The combinations of these operations realize an album distribution method practiced as an embodiment of the invention.

1. As shown in FIG. 3, the user 100 selects an album content to be looked at/listened to, enters the personal information including the settlement information of the user 100 necessary for the purchase of the selected album content, and executes operations of requesting the purchase of the album content (step A30).

2. In response to the purchase request from the user 100, the terminal 500 requests the content server 600 for the distribution of the first item of content of the album content selected by the user 100 (step A31).

3. In response to the request from the terminal 500 for the distribution of the first item of content, the content server 600 searches itself for the content requested by the terminal 500 and sends the retrieved content to the terminal 500 (the response to content distribution in step A32). The above-mentioned album-unique information is attached to the content.

The following describes the album management and content management by the content server 600. The content server 600 has databases shown in FIGS. 5 and 6 for example. Album information and the content described thereby are recorded to the album management database shown in FIG. 5. Content information is recorded to the content management database shown in FIG. 6.

4. The terminal 500 on which the first item of content has been downloaded requests the license server 700 for the distribution of the license for the first item of content. At the same time, the terminal 500 also sends the personal information of the user 100 to the license server 700 necessary for the creation of the license (step A33).

The personal information of the user 100 is intended for creating the license dedicated to the user 100 and therefore is unavailable for the other users, by use of the personal information of only the user 100 at creating the license. A most simple example is user ID, while more complicated one may be obtained by combining user's name, address, and password for example.

5. In response to the request for the distribution of the first item of content, the license server 700 creates the license for the first item of content on the basis of the personal information of the user 100 supplied from the terminal 500 (step A34).

6. Having created the license for the first item of content, the license server 700 sends the created license to the terminal 500 (step A35). This license is attached with content identification information for identifying the corresponding item of content or the above-mentioned album-unique information.

7. Receiving the license for the first item of content, the terminal 500 recognizes that the first item of content and its license have been normally distributed and then binding the first item of content and its license together, storing them in itself (A36).

The following describes the purchase management to be executed by the license server 700. The license server 700 has a database shown in FIG. 7 for example. The purchase log of each user is recorded to this purchase management database. At this moment, recording the distribution status of the license corresponding to each item of content to the purchase management database as a content purchase status allows the sure restarting of the downloading after the disconnection of the communication. It is also practicable to store the charging results in this database. This allows the license server 700, at the time of requesting the distribution of the licenses for the second and subsequent items of content, to determine the creation and distribution of the licenses for the second and subsequent items of content by checking the charging results instead of checking the purchase status of the first item of content. Further, it is practicable to execute the charging and settlement processing before the downloading of the first item of content and its license and distribute all licenses after checking the above-mentioned charging results or license distribution status.

8. In order to execute the charging and settlement processing for the album content immediately after sending the license of the first item of content to the terminal 500, the license server 700 creates charging and settlement information on the basis of the personal information of the user 100 supplied from the terminal 500 (step A37). Also, in order to execute the charging and settlement processing, the license server 700 requests the charging and settlement server 800 for the charging processing (step A38). At the same time, the license server 700 also sends the charging information created by it. It is also practicable to execute the charging and settlement processing after the distribution of the licenses of the second and subsequent items of content to the terminal 500. However, for the prevention of free-of-charge preview, it is desirable to execute the charging and settlement processing at the initial stage of the downloading sequence. It should be noted that the charging processing for album-distributed content is executed as album-unit charging in which charging is executed on all items of content in the album at the time of downloading the first item of content.

9. In response to the request by the license server 700 for charging, the charging and settlement server 800 executes the charging and settlement processing on the basis of the charging information supplied by the license server 700 (step A39). The charging and settlement server 800 notifies the license server 700 of the result of the processing (step A40). Then, in response to the notification, the license server 700 checks the notification, and if the processing is found not completed, then requests the charging and settlement server 800 to retry the charging and settlement processing. If the charging and settlement processing is found completed, the license server 700 does not request the charging and settlement server 800 to retry (step A41).

10. Next, as shown in FIG. 4, the terminal 500 requests the content server 600 for the distribution of the second and subsequent items of the album content to receive the distribution thereof in the same manner in which the terminal 500 received the distribution of the first item of content (step A42).

11. Having received the request for the distribution of the second and subsequent items of content from the terminal 500, the content server 600 searches itself for the content requested by the terminal 500 and sends the retrieved content to the terminal 500 (step A43).

12. Having received the distribution of the second and subsequent items of content, the terminal 500 requests the license server 700 for the distribution of the second and subsequent items of content to acquire the licenses of the second and subsequent items of content. At the same time, the terminal 500 also sends the personal information of the user 100 necessary for creating the licenses (step A44).

13. Having received the request for the distribution of the licenses of the second and subsequent items of content, the license server 700 checks the purchase status of the first item of content stored in the purchase management database shown in FIG. 7 on the basis of the personal information of the user 100 supplied from the terminal 500 (step A45).

14. If the purchase status checked in processing 12 indicates that the first item of content has not yet been purchased, then the license server 700 notifies the terminal 500 thereof (step A46). In response, the terminal 500 recognizes that the first item of content has not yet been purchased, notifies the user 100 thereof (by means of display the information thereof onto the terminal screen), and aborts the album content purchase processing (step A47).

15. If the purchase status checking in processing 12 indicates that the first item of content has already been purchased, then the license server 700 creates the licenses of the second and subsequent items of content on the basis of the personal information of the user 100 supplied from the terminal 500 (step A48).

16. Having created the licenses of the second and subsequent items of content, the license server 700 sends the created licenses to the terminal 500 (step A49). Receiving the distribution of the licenses of the second and subsequent items of content, the terminal 500 recognizes the normal completion of the distribution of the second and subsequent items of content and their licenses and then binds them together, storing them in itself (step A50).

17. Receiving the distribution of the second and subsequent items of content, the terminal 500 checks the number of distributed items of content (step A51). If all items of content are found distributed, the terminal 500 notifies the user 100 of the completion of the reception of all items of content. The user becomes ready for looking at/listening to the purchased content after the completion of the reception. On the other hand, if the reception of all items of content is found not completed, the terminal 500 makes preparations for the distribution of a next item of content (step A52) and repeats the processing 10 to processing 16 until the reception of all items of content is completed. At this moment, by checking the above-mentioned album-unique information attached to each license and the content identification information attached to each license or the album-unique information, the terminal 500 can understand the distribution status of all items of content contained in the album and their licenses. Consequently, if the communication is disconnected, the terminal 500 can quickly restart the downloading by use of this information.

While the preferred embodiments of the present invention have been described using specific terms, such description is for illustrative purposes only, and it is to be understood that changes and variations may be made without departing from the spirit or scope of the appended claims. For example, the network for distributing content may be separate from the network for communicating licenses.

What is claimed is:

1. A communication system comprising:
   a plurality of server apparatuses programmed to download data to client apparatuses; and
   a client apparatus interconnected via a network with the plurality of server apparatuses, wherein
   said client apparatus is programmed to transmit a purchase request for purchasing a content album, said content album including a plurality of content items, said content items being associated with a plurality of license files, wherein each license file includes a unique identifier,
   a first server apparatus is programmed as a content server to download to said client apparatus in response to the purchase request a first content item,
   a second server apparatus is programmed as a license server to download to said client apparatus in response to the purchase request a corresponding first license file associated with the first content item, the second server further programmed to execute a charging processing to create charging information, the charging information including a fee associated with all said content items,
   a third server apparatus is programmed to execute a charging processing as a charging and settlement server to charge the fee for said client apparatus, said third server apparatus executing the charging processing subsequent to the first server downloading to said client apparatus the first content item and the second server downloading to said client apparatus the corresponding first license file,
   said client apparatus is prociramnned to sequentially download a remainder of said plurality of content items and associated license files in response to the third server charging the fee for all of said content items, and
   said client apparatus is programmed to store the downloaded content items and the downloaded license files and binding each content item to respective corresponding license file.

2. The communication system according to claim 1, wherein any one of said server apparatuses and said client apparatus is adapted to determine a status of progress of downloading of said each of said content items.

3. The communication system according to claim 1, wherein said each license file is an independent data file.

4. The communication system according to claim 1, wherein said each unique identifier is associated with a content item.

5. A communication method comprising:
   transmitting by a client apparatus. a purchase request for purchasing a content album, wherein said content album includes a plurality of content items, said content items are associated with a plurality of license files, wherein each license file includes a unique identifier;
   in response to the purchase request, the client apparatus downloading, from a first server, a first content item and downloading the corresponding first license file associated with said first content item from a second server, the first server programmed as a content server, the second server programmed as a license server;
   subsequent to downloading the first content item and the corresponding first license file, the second server executing a charging processing to create charging information, the charging information including a fee associated with all said content items;
   charging the fee by a third server for said client apparatus based on the charging information, the third server programmed as a charging and settlement server:
   in response to the charging by the third server, said client apparatus sequentially downloading a remainder of said plurality of content items and their associated license files; and
   said client apparatus storing the downloaded content items and the downloaded license files and binding each content item to its corresponding license file.

6. The communication method according to claim 5, wherein any one of said servers and said client apparatus is adapted to determine a status of progress of downloading of said each of said content items.

7. The communication method according to claim 5, wherein said each license file is an independent data file.

8. The communication method according to claim 5, wherein said each unique identifier is associated with a content item.

* * * * *